(12) United States Patent
Jaskiewicz et al.

(10) Patent No.: US 11,506,300 B2
(45) Date of Patent: Nov. 22, 2022

(54) SERVO VALVE

(71) Applicant: Hamilton Sundstrand Corporation, Charlotte, NC (US)

(72) Inventors: Zbigniew Jaskiewicz, Wroclaw (PL); Sebastian Szymanski, Wroclaw (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/233,685

(22) Filed: Apr. 19, 2021

(65) Prior Publication Data

US 2021/0332905 A1 Oct. 28, 2021

(30) Foreign Application Priority Data

Apr. 26, 2020 (EP) .................................. 20461531

(51) Int. Cl.
*F16K 31/00* (2006.01)
*F16K 11/20* (2006.01)
*F15B 13/04* (2006.01)
*F16K 11/07* (2006.01)

(52) U.S. Cl.
CPC ........ *F16K 31/008* (2013.01); *F15B 13/0402* (2013.01); *F16K 11/07* (2013.01); *F16K 11/20* (2013.01)

(58) Field of Classification Search
CPC ...... F16K 31/008; F16K 31/007; F16K 11/07; F16K 11/20; F16K 11/22; F15B 13/0402; F15B 13/044; F15B 2211/3057; F15B 2211/322; F15B 2211/327
See application file for complete search history.

(56) References Cited

U.S. PATENT DOCUMENTS

| 4,114,645 A * | 9/1978 | Pauliukonis | F03G 7/06 137/596.17 |
|---|---|---|---|
| 4,971,106 A | 11/1990 | Tsutsui et al. | |
| 5,148,735 A | 9/1992 | Veletovac | |
| 7,849,870 B2 | 12/2010 | Dupuis et al. | |
| 2007/0075286 A1 | 4/2007 | Tanner | |
| 2010/0307621 A1* | 12/2010 | Rub | F15B 13/0402 137/861 |

(Continued)

FOREIGN PATENT DOCUMENTS

| CN | 108716489 A | 10/2018 |
|---|---|---|
| EP | 1878958 A1 | 1/2008 |
| EP | 2456985 A1 | 5/2012 |

(Continued)

OTHER PUBLICATIONS

CN108716489A Abstract.

(Continued)

*Primary Examiner* — Kelsey E Cary
(74) *Attorney, Agent, or Firm* — Cantor Colburn LLP (57) ABSTRACT

A servo valve comprises a first spool extending along a first spool axis, a second spool extending along a second spool axis, a first piezoelectric actuator, and a second piezoelectric actuator. The first piezoelectric actuator is operatively connected to the first spool for translating the first spool in response to a voltage applied thereto. The second piezoelectric actuator is operatively connected to the second spool for translating the second spool in response to a voltage applied thereto.

11 Claims, 8 Drawing Sheets

(56) References Cited

U.S. PATENT DOCUMENTS

2017/0292541 A1* 10/2017 Miyazoe .............. F16K 11/207
2019/0195381 A1   6/2019 Jaskiewicz

FOREIGN PATENT DOCUMENTS

| EP | 3502486 A1 | 6/2019 |
| FR | 3026321 A1 | 4/2016 |
| FR | 3026456 A1 | 4/2016 |
| WO | 2011009870 A1 | 1/2011 |

OTHER PUBLICATIONS

EP1878958A1 Abstract.
Extended European Search Report for International Application No. 20461531.4 dated Oct. 1, 2020, 10 pages.
FR3026321A1 Abstract.
FR3026456A1 Abstract.

* cited by examiner

Fig. 7

SERVO VALVE

FOREIGN PRIORITY

This application claims priority to European Patent Application No. 20461531.4 filed Apr. 26, 2020, the entire contents of which is incorporated herein by reference.

TECHNICAL FIELD

This disclosure relates to a servo valve. This disclosure also relates to an actuation system and a method of controlling a servo valve.

BACKGROUND

Figure 1:
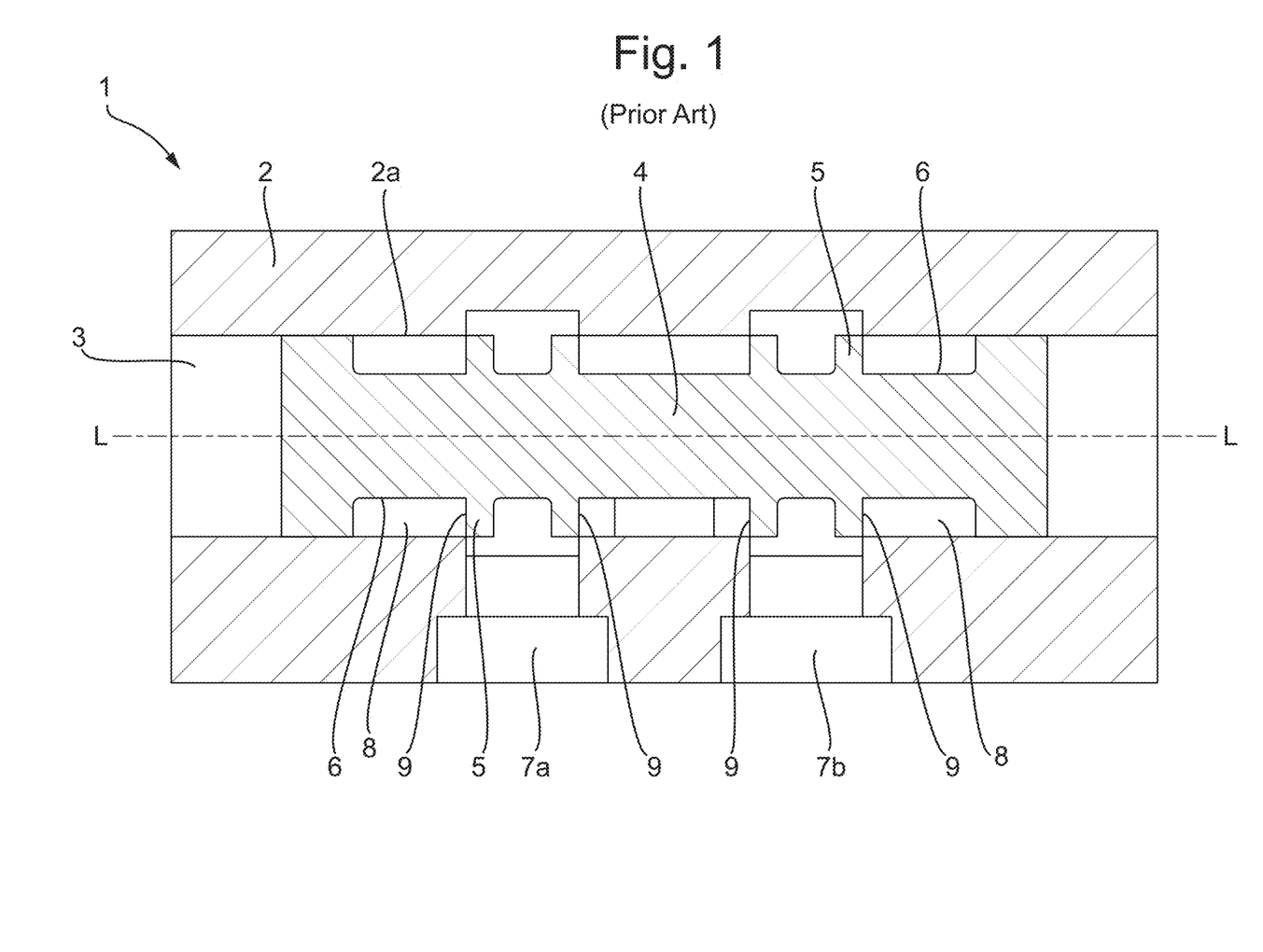
FIG. 1 shows a cross-sectional view of a prior art spool valve.

Spool valves are well-known in the art for controlling hydraulic systems. As shown in FIG. 1, a typical spool valve 1 comprises a spool housing 2 having a spool cavity 3 defined by an inner surface 2a of the housing 2, and a spool 4 disposed within the spool cavity 3 having a plurality of lands 5 separated by a plurality of grooves 6. The spool 4 is moveable along its longitudinal axis L in response to actuation of the spool valve 1, and the lands 5 are in sliding contact with the inner surface 2a of the housing 2. The spool valve 1 further comprises control ports 7a, 7b passing through the inner surface 2a of the housing 2 in fluid communication with the spool cavity 3. Chambers 8 are defined between the groove 6, the land 5 and the inner surface 2a of the housing 2. The lands 5 have radially extending metering edges 9 (as are well-known in the art of spool valves) which permit or prevent fluid communication between the control ports 7a, 7b and the chambers 8 depending on the longitudinal position of the spool 4 within the spool cavity 3.

FIG. 1 shows the spool valve 1 in an equilibrium position, where the metering edges 9 are radially aligned with the edges of the control ports 7a, 7b such that no fluid communication is permitted between the control ports 7a, 7b and the chambers 8. Actuation of the spool valve 1 causes the spool 4 to move longitudinally (either to the left or the right of the Figure), which causes the metering edges 9 to become radially misaligned with the edges of the control ports 7a, 7b. This permits fluid communication between a control port 7a, 7b and a respective chamber 8.

Chambers 8 are further in communication with an oil system (not illustrated) to permit fluid flow through the spool valve 1 when the spool 4 is moved from the equilibrium position. For example, when the spool 4 is moved to the right of the equilibrium position, fluid may enter the spool valve 1 through port 7a and exit the spool valve 1 through port 7b. When the spool 4 is moved to the left of the equilibrium position, fluid may enter the spool valve 1 through port 7b and exit through port 7a. In this way, actuation of the spool valve 1 can be used to control fluid movement in a hydraulic system, such as a servo valve.

Figure 2:
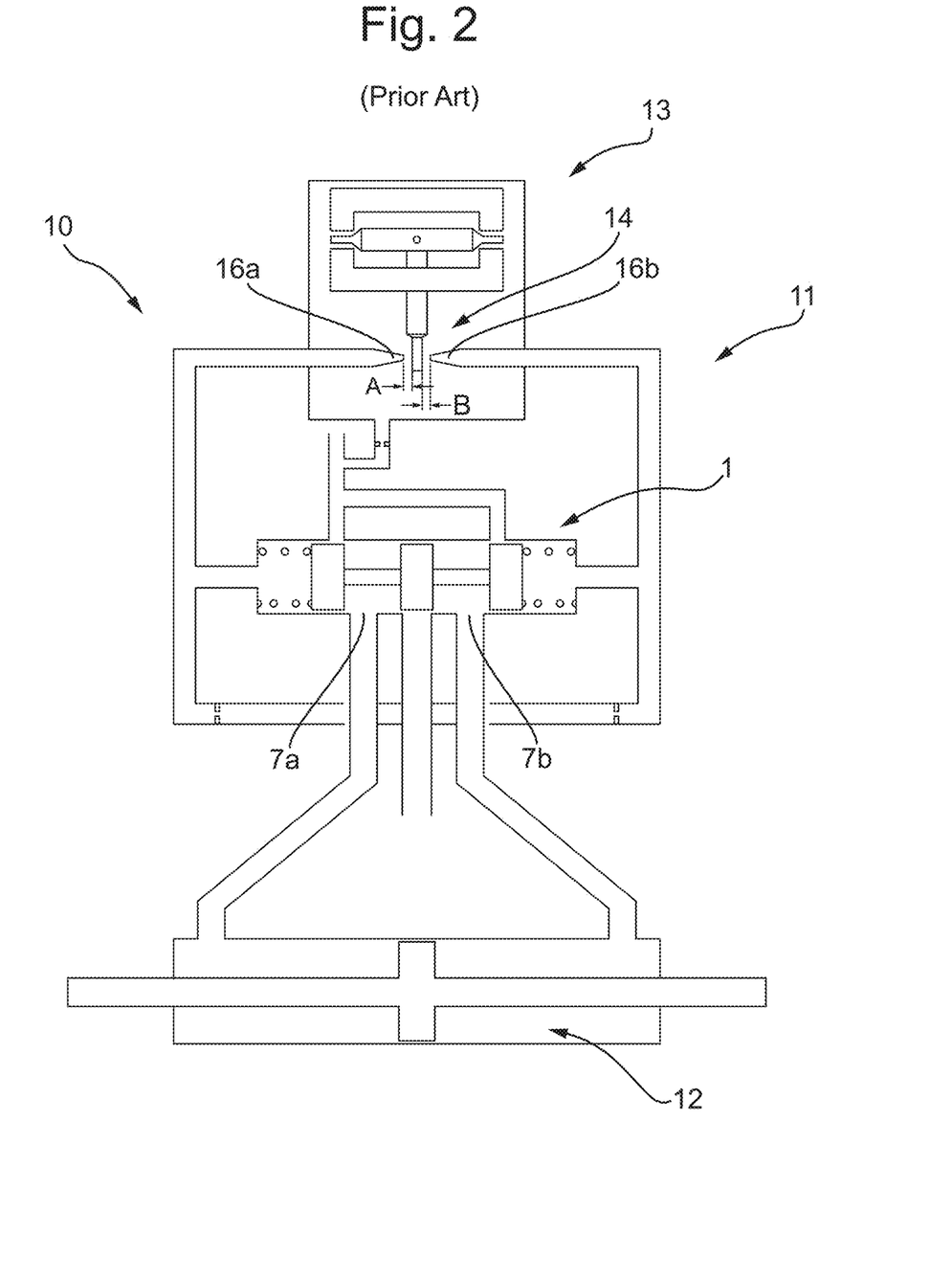
FIG. 2 shows a schematic of a prior art actuation system.

FIG. 2 shows a known actuation system 10. The actuation system 10 has a servo valve 11 and a hydraulic actuator 12. The servo valve 11 comprises the spool valve 1 and a pilot stage 13 for actuating the spool valve 1. The pilot stage 13 has a flapper 14 deflected by an armature connected to an electric motor (not illustrated) away or towards nozzles 16a, 16b to control fluid flow to the spool valve 1. The ports 7a, 7b of the spool valve are in fluid communication with the hydraulic actuator 12. The amount of deflection of the flapper 14 controls the respective distances A, B between the nozzles 16a, 16b and the flapper 14, which varies the amount of fluid injected from the nozzles 16a, 16b to the spool valve 1, and thus the amount of fluid communicated to the actuator 12 via the spool valve 1, to control actuator movement.

Known servo valves 11 and actuation systems 10 may have various drawbacks. For example, very precise tolerances are required for the lands 5 in order to block fluid flow from the ports 7a, 7b in the equilibrium position and to provide desired fluid flow when the spool 4 is moved from the equilibrium position. The prior art spool 4 has four such high-tolerance lands 5. The lands 5 may wear over time, thus permitting unintended fluid flow and requiring replacement of the spool 4 with a new part. Moreover, the need for a pilot stage 13 to drive the spool valve 1 can add extra weight and complexity to the system.

Figure 3:
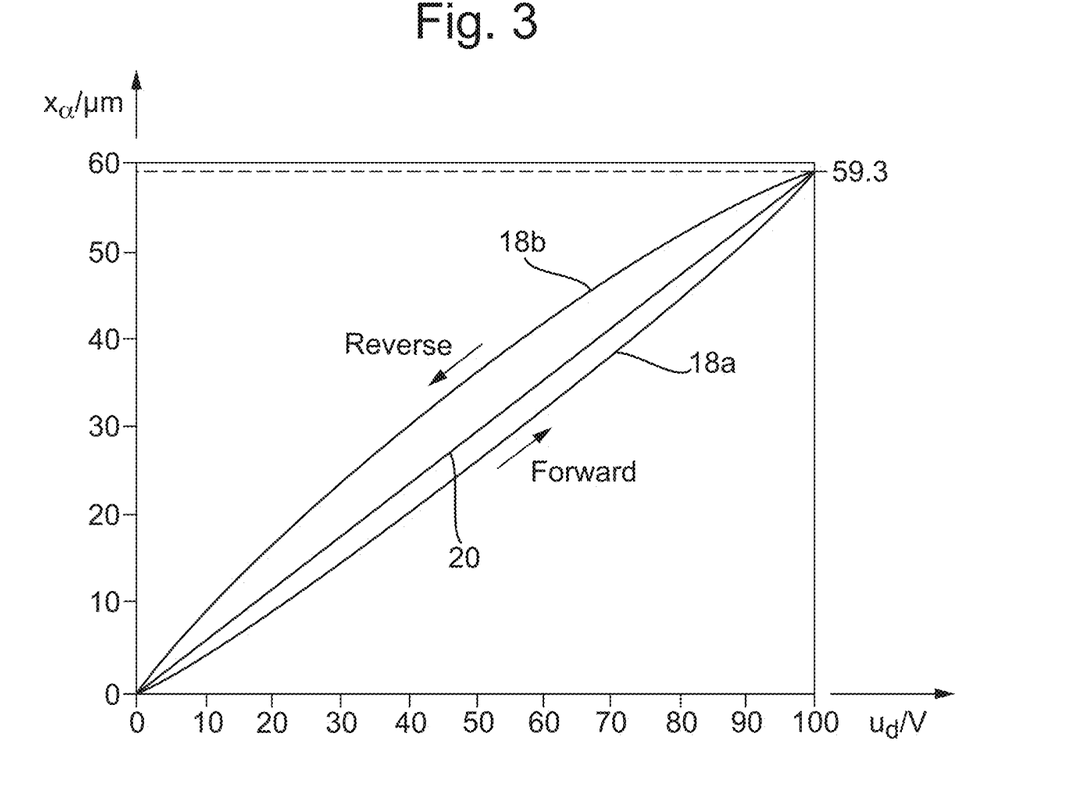
FIG. 3 shows a graph of a characteristic spool displacement vs control signal voltage for a prior art piezoelectric servo valve.

Servo valves utilising piezoelectric actuators have been proposed, for example, in US 2007/0075286. However, such servo valves may still suffer from various drawbacks due to the use of a single spool. For example, when referring to FIG. 3, one such drawback may be that the characteristic of the longitudinal displacement of the spool is different depending on whether the piezoelectric control signal voltage is increasing or decreasing. Curve 18a shows a typical response in longitudinal spool displacement for an increasing voltage. Curve 18b shows a typical response in longitudinal spool displacement for a decreasing voltage. Line 20 indicates the ideal, linear relationship between voltage and longitudinal spool displacement for comparison. The discrepancy and resulting hysteresis provided by curves 18a and 18b may reduce the accuracy of spool displacement for a given control signal, and thus reduce the accuracy of the actuation system.

SUMMARY

From a first aspect, the present disclosure provides a servo valve comprising a first spool extending along a first spool axis, a second spool extending along a second spool axis, a first piezoelectric actuator, and a second piezoelectric actuator. The first piezoelectric actuator is operatively connected to the first spool for translating the first spool in response to a voltage applied thereto. The second piezoelectric actuator is operatively connected to the second spool for translating the second spool in response to a voltage applied thereto.

In an embodiment of the above aspect, the first and second spool axes are co-axial.

In a further embodiment of any of the above, the first piezoelectric actuator extends along a first piezoelectric actuator axis co-axial with the first spool axis. The second piezoelectric actuator extends along a second piezoelectric actuator axis co-axial with the second spool axis.

In a further embodiment of any of the above, the first piezoelectric actuator is fixedly attached to the first spool. The second piezoelectric actuator is fixedly attached to the second spool.

In a further embodiment of any of the above, the first piezoelectric actuator (112a) is disposed against a first axial end of the first spool. A first biasing element is disposed against a second, opposing axial end of the first spool. The second piezoelectric actuator is disposed against a first axial end of the second spool. A second biasing element is disposed against a second, opposing axial end of the second spool.

In a further embodiment of the above, the first and second biasing elements are disc springs. Translation of the first and second spools compresses or expands the first and second biasing elements.

In a further embodiment of any of the above, the first and second biasing elements comprise piezoelectric discs. Compression or expansion of the first and second biasing elements creates a dimensional change in the piezoelectric discs that generates a voltage indicative of the amount of dimensional change.

In a further embodiment of any of the above, the servo valve is configured such that each of the first and second piezoelectric actuators is independently controllable, such that the first and seconds spools are independently translatable.

In a further embodiment of any of the above, the servo valve further comprises a servo valve housing including a first spool cavity, a second spool cavity, a first control port opening into the first cavity for fluid communication therewith, and a second control port opening into the second cavity for fluid communication therewith. The first spool cavity defines a first inner cavity surface. The first spool is disposed within the first spool cavity. The second spool cavity defines a second inner cavity surface. The second spool is disposed within the second spool cavity.

In a further embodiment of the above, the first spool comprises a first pair of lands separated by a first groove defining a first metering edge and an opposing second metering edge. The second spool comprises a second pair of lands separated by a second groove defining a third metering edge and an opposing fourth metering edge. The first pair of lands are in sliding contact with the first inner cavity surface. Translation of the first spool allows the first and second metering edges to open or close a respective gap between the first and second metering edges and the first inner cavity surface. The second pair of lands are in sliding contact with the second cavity inner surface. Translation of the second spool allows the third and fourth metering edges to open or close a respective gap between the third and fourth metering edges and the second inner cavity surface.

In a further embodiment of the above, the servo valve further comprises a supply port, a first supply chamber, a second supply chamber, a return port, a first return chamber and a second return chamber. The supply port is upstream of the first and second spool cavities. The first supply chamber opens into the first spool cavity. The second supply chamber opens into the second spool cavity. The first and second supply chambers are in fluid communication with the supply port and are configured to communicate fluid from the supply port to the first and second spool cavities, respectively. The return port is downstream of the first and second spool cavities. The first return chamber opens into the first spool cavity. The second return chamber opens into the second spool cavity. The first and second return chambers are in fluid communication with the return port and are configured to communicate fluid from the first and second spool cavities to the return port, respectively. Translation of the first spool allows the first metering edge to open or restrict a first fluid flow path between the first supply chamber and the first control port, and allows the second metering edge to open or restrict a second fluid flow path between the first control port and the first return chamber. Translation of the second spool allows the third metering edge to open or restrict a third fluid flow path between the second supply chamber and the second control port, and allows the fourth metering edge to open or restrict a fourth fluid flow path between the second control port and the second return chamber.

From a second aspect, the present disclosure provides an actuation system comprising the servo valve according to the aspect, or any embodiment thereof, described above, and a hydraulic actuator in fluid communication with the first and second control ports, such that translation of the first and second spools controls movement of the hydraulic actuator.

From a third aspect, the present disclosure provides a method of controlling the servo valve of the first aspect. The method comprises supplying a voltage to the first and second piezoelectric actuators causing a change in dimension thereof to translate the first and second spools.

In an embodiment of the above aspect, the method further comprises supplying voltage to each of the first and second piezoelectric actuators independently to change the axial dimension of each piezoelectric actuator independently.

BRIEF DESCRIPTION OF DRAWINGS

One or more non-limiting examples will now be described, by way of example only, and with reference to the accompanying figures in which.

DETAILED DESCRIPTION

FIGS. 4 to 8 show a servo valve 100 according to the present disclosure. The servo valve has a servo valve housing 102, a first control port 104a, a second control port 104b, a supply port 106 and a return port 107. The first and second control ports 104a, 104b are adapted to fluidly connect to a downstream hydraulic component, such as a hydraulic actuator (not shown). The supply port 106 and the return port 107 are fluidly connected to a hydraulic fluid circuit (not shown). The supply port 106 permits hydraulic fluid to flow into the servo valve 100. The return port 107 permits hydraulic fluid from the servo valve 100 to be returned back to the circuit for recirculation to the supply port 106.

Figure 5:
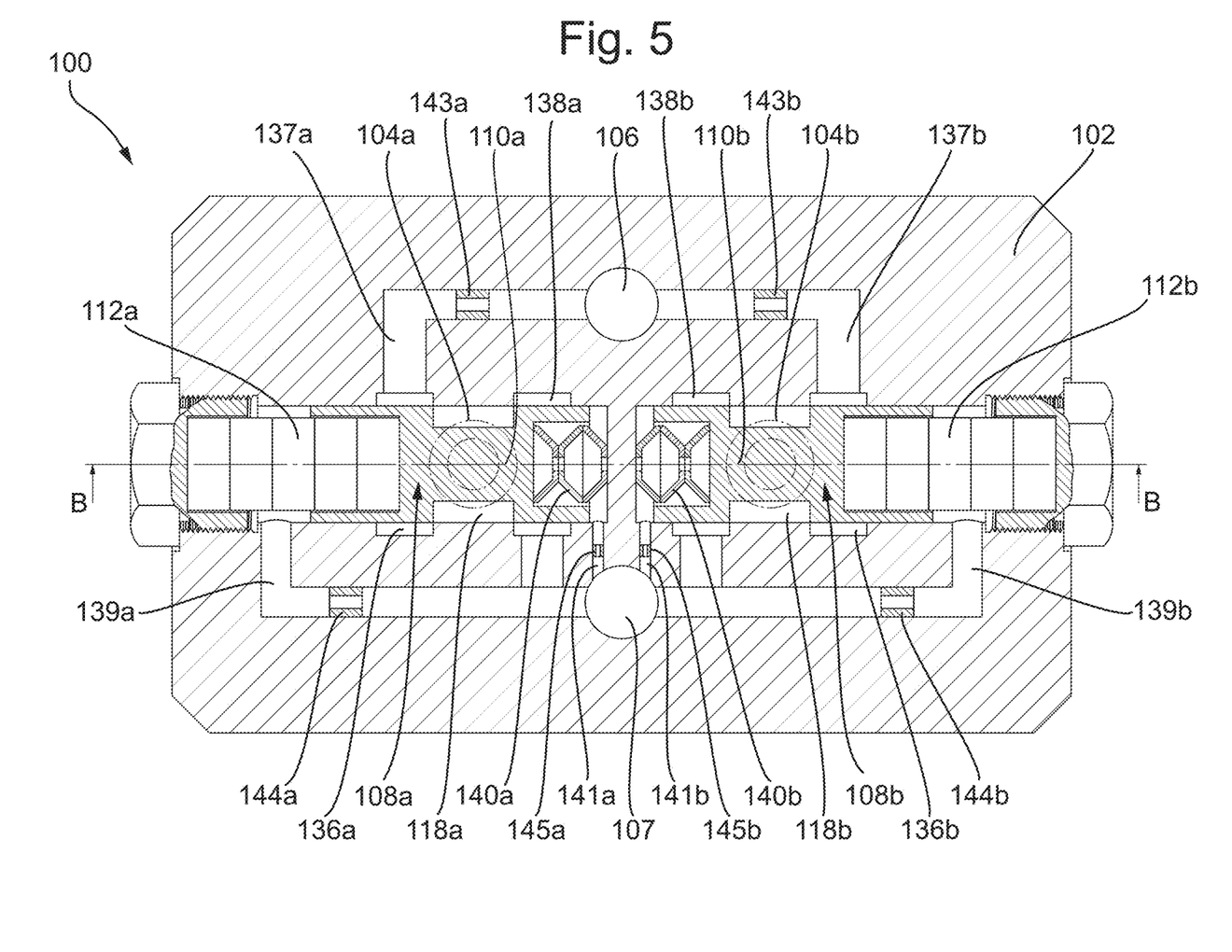
FIG. 5 shows a section view of the spool valve viewed along line A-A as indicated in FIG. 4.
Figure 6:
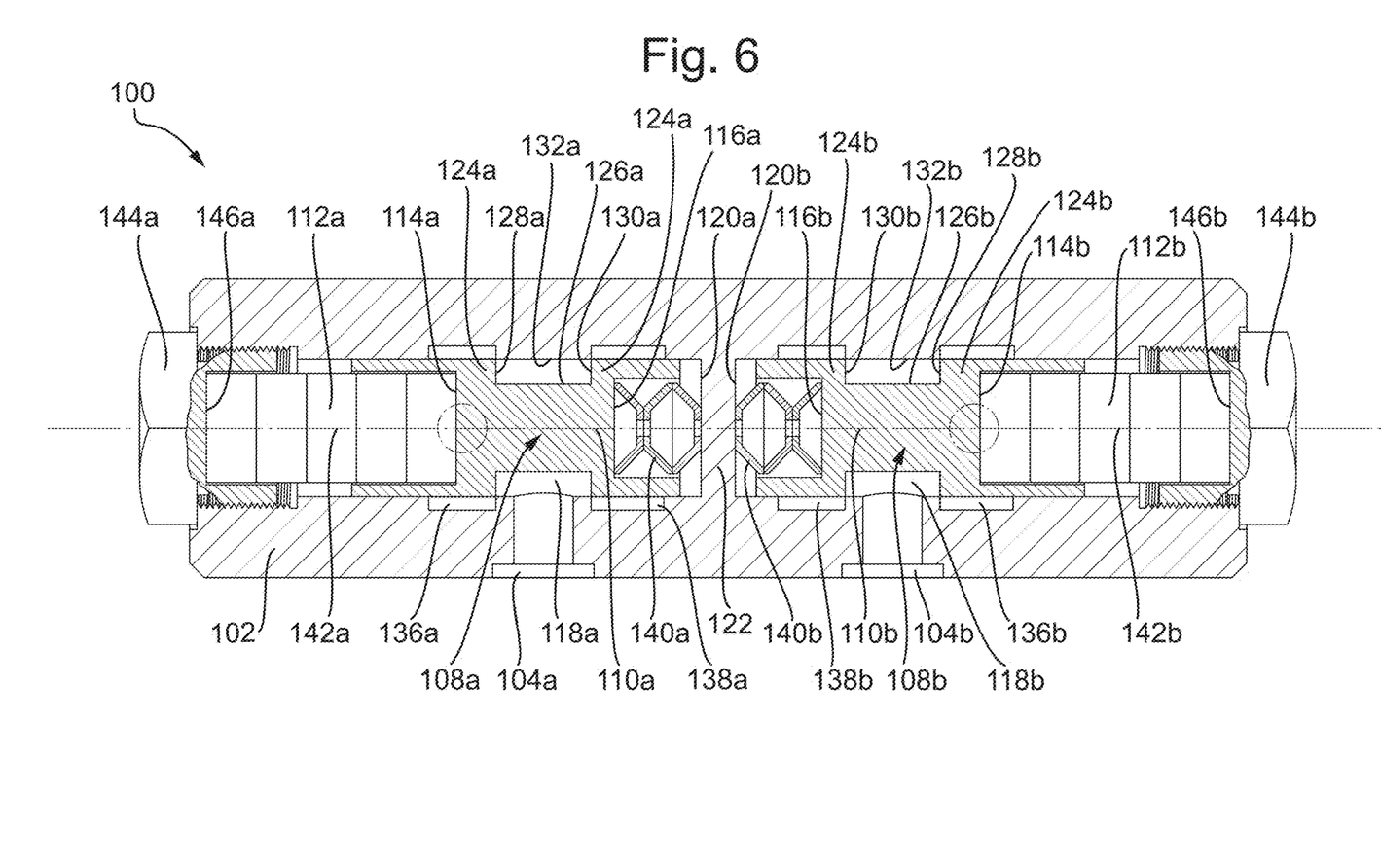
FIG. 6 shows a section view of the spool valve viewed along line B-B as indicated in FIG. 5.

Referring to FIGS. 5 and 6, the servo valve 100 has a first spool 108a extending along a first spool axis 110a and a second spool 108b extending along a second spool axis 110b. A first piezoelectric actuator 112a is operatively connected to the first spool 108a for translating the first spool 108a in a direction parallel to the first spool axis 110a in response to a voltage applied thereto. A second piezoelectric actuator 112b is operatively connected to the second spool 108b for translating the second spool 108b in a direction parallel to the second spool axis 110b in response to a voltage applied thereto.

An actuation system may comprise the servo valve 100 and a hydraulic actuator in fluid communication with the first and second control ports 104a, 104b, such as the hydraulic actuator 12 schematically illustrated in FIG. 2. Translation of the first and second spools 108a, 108b controls movement of the hydraulic actuator.

It is to be understood that the term 'translating' has substantially the same meaning as the term 'moving', and these terms may be used interchangeably.

The first and second spool axes 110a, 110b are longitudinal axes of the respective spool 108a, 108b along which the spools 108a, 108b extend. The first and second spool axes 110a, 110b extend from a first axial end 114a, 114b to a second, opposing axial end 116a, 116b of the respective spools 108a, 108b. In the embodiment shown, the first and second spool axes 110a, 110b are co-axial along a common axis such that the first and second spools 108a, 108b are axially aligned. It is to be understood that within the scope of this disclosure, this need not be the case. For instance, in other embodiments, the first and second spools 108a, 108b need not be axially aligned with each other. The first and second spool axes 110a, 110b may be offset such that the first and second spool axes 110a, 110b are not co-axial. For example, the first and second spool axes 110a, 110b may be parallel and offset from each other such that the first spool 108a is stacked on top of the second spool 108b.

The servo valve housing 102 defines a first spool cavity 118a and a second spool cavity 118b. The first spool 108a is disposed within the first spool cavity 118a and the second spool 108b is disposed within the second spool cavity 118b. Proximate ends 120a, 120b of the first and second spool cavities 118a, 118b respectively are separated by a portion 122 of the housing 102.

The first control port 104a opens into the first spool cavity 118a and the second control port 104b opens into the second spool cavity 118b. Accordingly, when the servo valve 100 is used in an actuation system, the control ports 104a, 104b provide fluid communication between the first and second spool cavities 118a, 118b (respectively) and a hydraulic component downstream thereof (as discussed above).

FIGS. 5 and 6 show the servo valve 100 with the spools 108a, 108b in an equilibrium position, where substantially no fluid flow into or out of the control ports 104a, 104b is permitted.

Referring to FIG. 6, the first spool 108a has a first pair of lands 124a separated by a first groove 126a defining a first metering edge 128a and an opposing second metering edge 130a. The second spool 108b has a second pair of lands 124b separated by a second groove 126b defining a third metering edge 128b and an opposing fourth metering edge 130b. The first pair of lands 124a are in sliding contact with an inner surface 132a of the first spool cavity 118a. The sliding contact permits translation of the first spool 108a along axis 110a within the cavity 118a. The second pair of lands 124b are in sliding contact with an inner surface 132b of the second spool cavity 118b. The sliding contact permits translation of the second spool 108b along axis 110b.

Referring to FIGS. 5 and 6, the supply port 106 is provided upstream of the first and second spool cavities 118a, 118b. A first supply chamber 136a opens into the first spool cavity 118a. A second supply chamber 136b opens into the second spool cavity 118b. The first and second supply chambers 136a, 136b are in fluid communication with the supply port 106 and configured to communicate fluid pressure from the supply port 106 to the first and second spool cavities 118a, 118b, respectively. In the embodiment shown, supply conduits 137a, 137b are provided in the housing 102 for fluidly connecting the first and second supply chambers 136a, 136b with the supply port 106. The supply conduits 137a, 137b may include orifices 143a, 143b for controlling fluid flow.

The return port 107 is provided downstream of the first and second spool cavities 118a, 118b. A first return chamber 138a opens into the first spool cavity 118a. A second return chamber 138b opens into the second spool cavity 118b. The first and second return chambers 138a, 138b are in fluid communication with the return port 107 and configured to communicate fluid pressure from the first and second spool cavities 118a, 118b to the return port 107, respectively. In the embodiment shown, return conduits 139a, 139b are provided in the housing 102 for fluidly connecting the first and second return chambers 138a, 138b with the return port 107. The return conduits 139a, 139b may include orifices 144a, 144b for controlling fluid flow.

Figure 4:
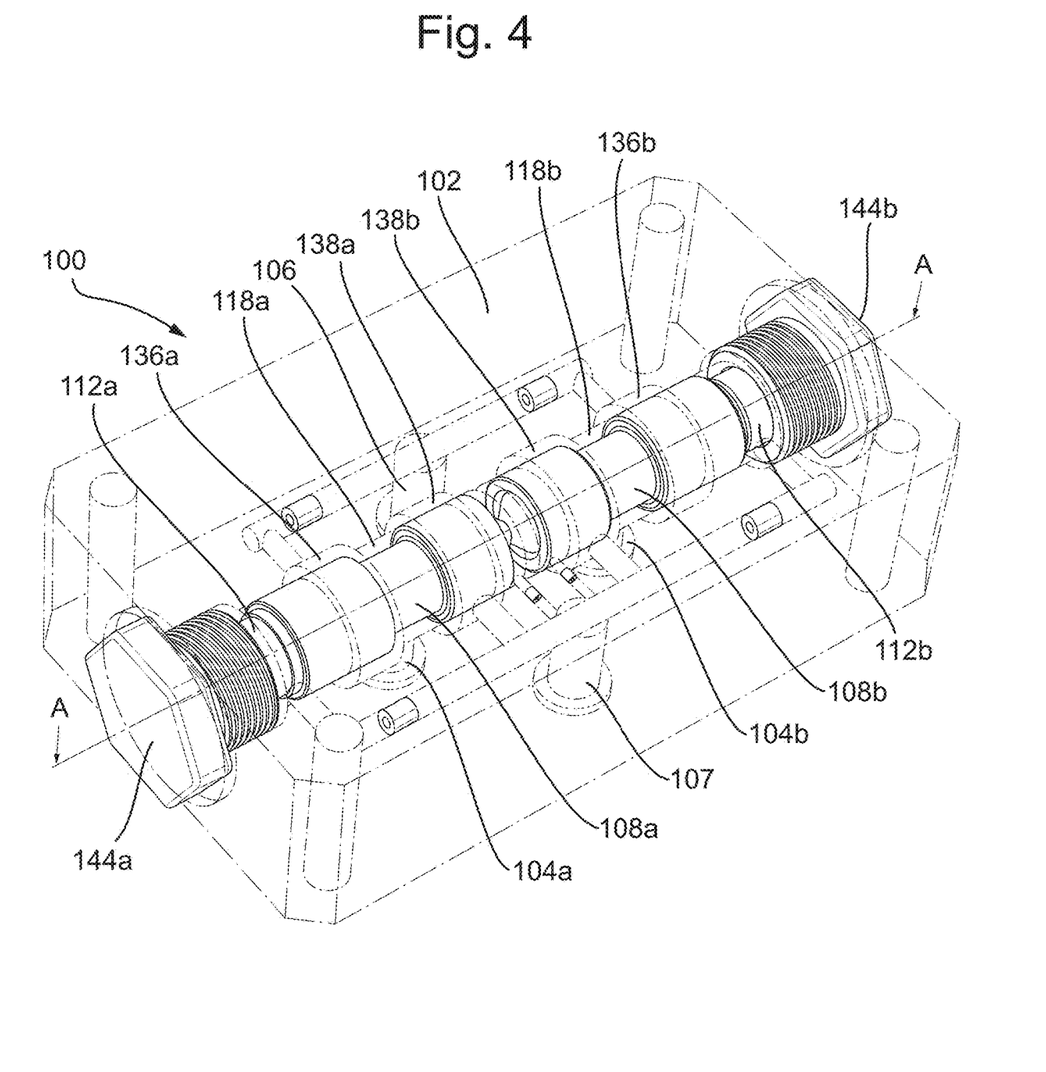
FIG. 4 shows a transparent perspective view of a spool valve in accordance with the present disclosure.

As can be seen most clearly from FIG. 4, the spools 108a, 108b, cavities 118a, 118b, piezoelectric actuators 112a, 112b and supply and return chambers 136a, 136b, 138a, 138b are all generally annular in shape.

Translation of the first spool 108a along axis 110a allows the first metering edge 128a to open or restrict a first fluid flow path between the first supply chamber 136a and the first control port 104a, and allows the second metering edge 130a to open or restrict a second fluid flow path between the first control port 104a and the first return chamber 138a. Translation of the second spool 108b along axis 110b allows the third metering edge 128b to open or restrict a third fluid flow path between the second supply chamber 136b and the second control port 104b, and allows the fourth metering edge 130b to open or restrict a fourth fluid flow path between the second control port 104b and the second return chamber 138b.

The first piezoelectric actuator 112a is disposed against the first axial end 114a of the first spool 108a in cavity 118a. A first biasing element 140a is disposed against the second, opposing axial end 116a of the first spool 108a. A portion of the cavity 118a around the first piezoelectric actuator 112a is fluidly connected to the return port 107 via conduit 139a. The second piezoelectric actuator 112b is disposed against the first axial end 114b of the second spool 108b in cavity 118b, and a second biasing element 140b is disposed against the second, opposing axial end 116b of the second spool 108b. A portion of the cavity 118b around the second piezoelectric actuator 112b is fluidly connected to the return port 107 via conduit 139b.

In the embodiment shown, the first and second biasing elements 140a, 140b are located in the respective spool cavities 118a, 118b. The first and second biasing elements 140a, 140b are retained against opposing sides of the portion 122 of the housing 102 that separates the cavities 118a, 118b. Additional return conduits 141a, 141b may be provided in the housing 102 for fluidly connecting the portion of the cavities 118a, 118b containing the biasing elements 140a, 140b with the return port 107. The additional return conduits 141a, 141b may include orifices 145a, 145b for controlling fluid flow.

It is to be understood that within the scope of this disclosure other configurations are possible. For example, the biasing elements 140a, 140b may be supported against separate portions of the housing 102, rather than common portion/wall 122 or the position of the actuators 112a, 112b and the biasing elements 140a, 140b could be reversed.

In the embodiment shown, the first and second biasing elements 140a, 140b are disc springs, such as Belleville springs. Translation of the first and second spools 108a, 108b along axes 110a, 110b compresses or expands the first and second biasing elements 140a, 140b. For example, movement of the first spool 108a towards the portion 122 compresses the first biasing element 140a. Movement of the second spool 108b towards the portion 122 compresses the second biasing element 140b. The biasing elements 140a, 140b may provide a restoring force against the second ends 116a, 116b of the spools 108a, 108b that biases the spools 108a, 108b towards the equilibrium position.

By utilising a known stiffness of the biasing elements 140a, 140b, the force exerted on the spools 108a, 108b per unit voltage applied to the piezoelectric actuators 112a, 112b and the resulting spool displacement therefrom can be measured and/or calibrated.

In some embodiments, the first and second biasing elements 140a, 140b are piezoelectric discs. In such embodiments, compression or expansion of the first and second biasing elements 140a, 140b creates a dimensional change in the piezoelectric discs that generates a voltage indicative of the amount of dimensional change. Piezoelectric biasing elements 140a, 140b may be used to provide accurate spool position data and feedback.

The first piezoelectric actuator 112a extends along a first piezoelectric actuator axis 142a co-axial with the first spool axis 110a. The second piezoelectric actuator 112b extends along a second piezoelectric actuator axis 142b co-axial with the second spool axis 110b. It is to be understood that dimensional change of the first and second piezoelectric actuators 112a, 112b in response to an applied voltage is configured to occur parallel to the first and second spool axes 110a, 110b respectively, to provide translation of the spools 108a, 108b there along.

The piezoelectric actuators 112a, 112b are retained in the housing 102 by first and second caps 144a, 144b. The caps 144a, 144b are mounted in the housing 102 by any suitable means (for example, are threadably engaged therewith or interference fit therein). The caps 144a, 144b also serve to close and seal cavities 118a, 118b from the exterior of the housing 102. The caps 144a, 144b each have a recess 146a, 146b for receiving respective piezoelectric actuators 112a, 112b.

An electrical signal may be supplied to the piezoelectric actuators 112a, 112b via any suitable means, for example, via wires (not shown) running through the housing 102.

The piezoelectric actuators 112a, 112b each comprise at least one piezoelectric material, and can be configured such that an electrical signal can be supplied to each piezoelectric actuator 112a, 112b separately, for instance, using separate power supplies (not shown). In the depicted embodiment, the piezoelectric actuators 112a, 112b comprise a piezoelectric stack. As will be appreciated by one skilled in the art, application of an electrical signal to the piezoelectric actuators 112a, 112b will result in a change in dimension in the piezoelectric material, which can be used to move the spools 108a, 108b in an axial direction parallel and co-axial with the respective spool axes 110a, 110b. In this manner, electrical energization of the piezoelectric actuators 112a, 112b allows axial translation of the spools 108a, 108b along the respective spool axes 110a, 110b. As will be understood by the skilled person, the degree and direction of axial translation can be adjusted by varying the amount and polarity of voltage used to energize the piezoelectric actuators 112a, 112b. In this manner, the first piezoelectric actuator 112a can be used to adjust the axial distance between the metering edges 128a, 130a of the first spool 108a and the respective supply/return chambers 136a, 138a, in order to control the amount of fluid flow through the first control port 104a. The second piezoelectric actuator 112b can be used to adjust the axial distance between the metering edges 128b, 130b of the second spool 108b and the respective supply/return chambers 136b, 138b, in order to control the amount of fluid flow through the second control port 104b. Within the scope of this disclosure, any suitable type of piezoelectric actuator, including any suitable material piezoelectric material, may be used.

Figure 7:
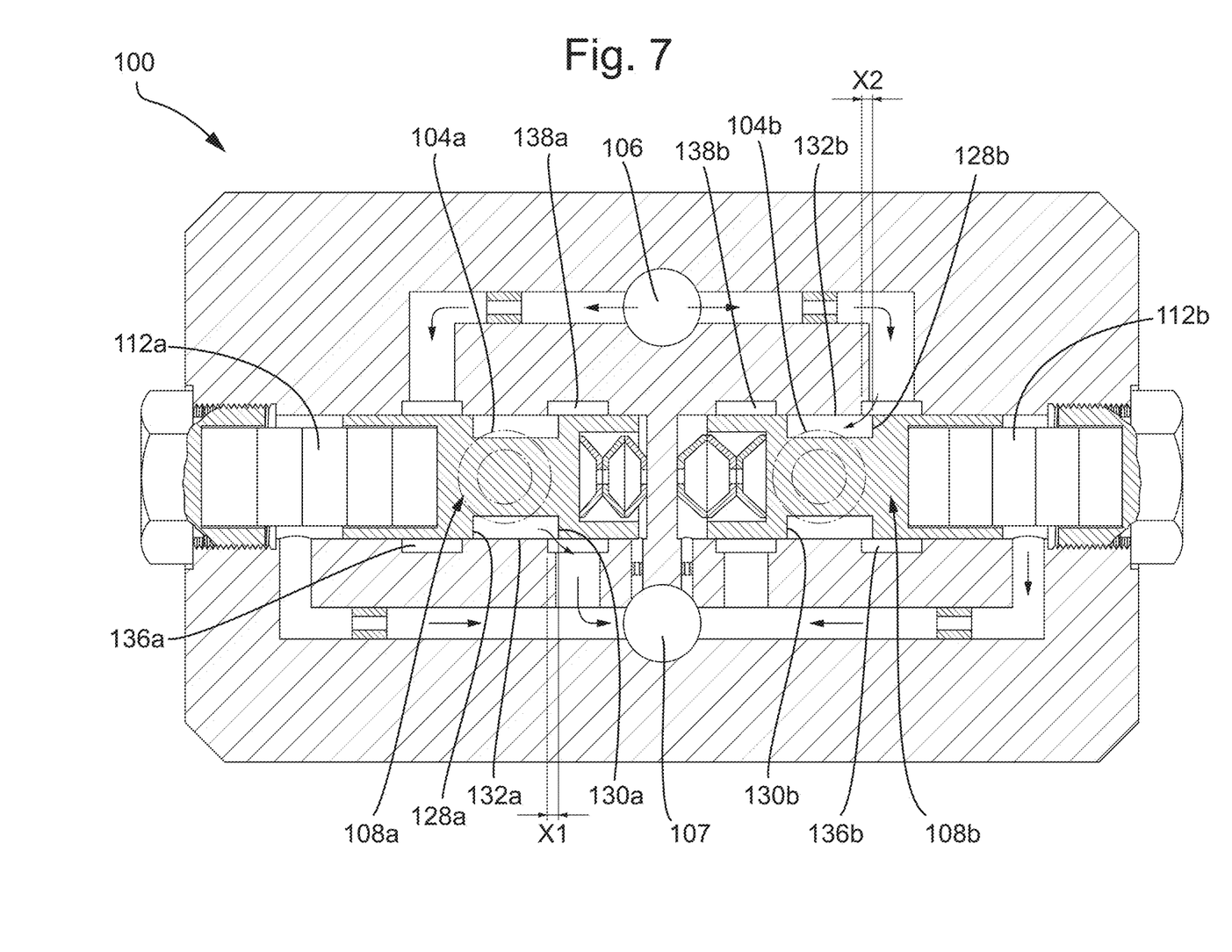
FIG. 7 shows the view of FIG. 5, with the spools offset to the right.
Figure 8:
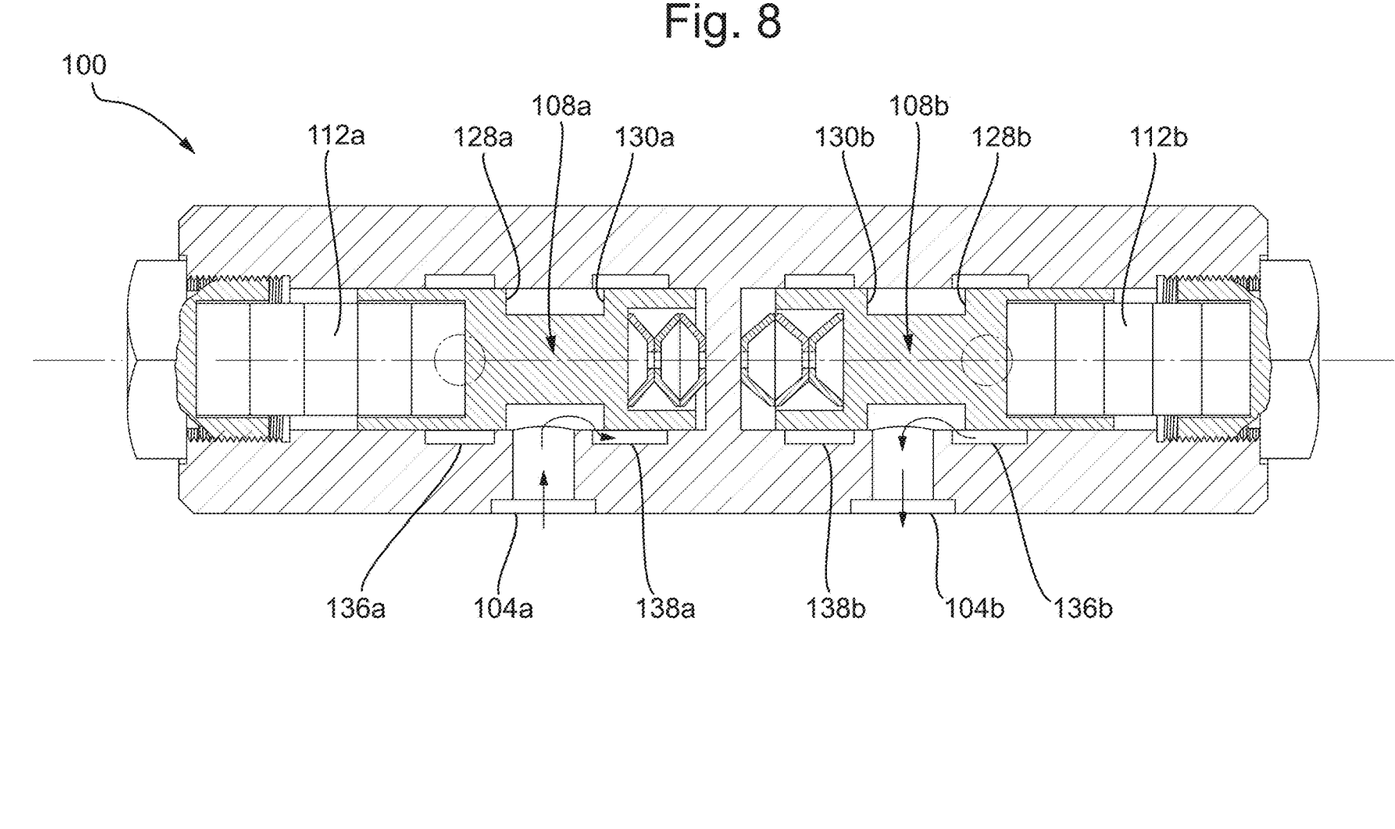
FIG. 8 shows the view of FIG. 6, with the spools offset to the right.

FIGS. 7 and 8 show the servo valve 100 with the first and second spools 108a, 108b moved to the right by increasing the dimension of the first piezoelectric actuator 112a and decreasing the dimension of the second piezoelectric actuator 112b with respect to the equilibrium position shown in FIGS. 5 and 6.

In this configuration, the first metering edge 128a is positioned to block fluid flow from the supply port 106 to the first control port 104a via the first supply chamber 136a (i.e. to block the aforementioned first fluid flow path). The third metering edge 128b is positioned such that a gap X2 is opened between the third metering edge 128b and the inner surface 132b, so fluid flow is enabled from the supply port 106 to the second control port 104b via the second supply chamber 136b (i.e. to open the aforementioned third fluid flow path). The second metering edge 130a is positioned such that a gap X1 is opened between the second metering edge 130a and the inner surface 132a, so fluid flow is enabled from the first control port 104a, into the first return chamber 138a and out through the return port 107 (i.e. to open the aforementioned second fluid flow path). The fourth metering edge 130b is positioned to block fluid flow to the return port 107 via the second return chamber 138b (i.e. to block the aforementioned fourth fluid flow path). In this manner, the servo valve 100 can be used to provide a desired amount of fluid flow from the supply port 106 to the second control port 104b, and from the first control port 104a to the return port 107.

It will be appreciated that moving the first and second spools 108a, 108b to the left by decreasing the dimension of the first piezoelectric actuator 112a and increasing the dimension of the second piezoelectric actuator 112b with respect to the equilibrium position would have the opposite effect (not illustrated). That is to say, the third metering edge 128b would be positioned to block fluid flow from the supply port 106 to the second control port 104b via the second supply chamber 136b (i.e. to block the aforementioned third fluid flow path). The first metering edge 128a would be positioned to enable fluid flow from the supply port 106 to the first control port 104a via the first supply chamber 136a (i.e. to open the aforementioned first fluid flow path). The fourth metering edge 130b would be positioned to enable fluid flow from the second control port 104b to the return port 107 via the second return chamber 138b (i.e. to open the aforementioned fourth fluid flow path). The second metering edge 130a would be positioned to block fluid flow to the return port 107 via the first return chamber 138a (i.e. to block the aforementioned second fluid flow path). In this manner, the servo valve 100 can be used to provide a desired amount of fluid flow from the supply port 106 to the first control port 104a, and from the second control port 104b to the return port 107.

As will be appreciated by the skilled person, these movements of the spools 108a, 108b and resulting fluid flows can be used to control the movement of a hydraulic actuator downstream of the control ports 104a, 104b (not shown), such as discussed above. In some embodiments, such an actuator can be used to control the positioning of a flight control surface for an aircraft.

As will be appreciated by the skilled person, the size of the gaps X1, X2 (i.e. axial distance along spool axes 110a, 110b) provided between the metering edges 128a, 128b, 130a, 130b and the respective inner surfaces 132a, 132b is determined by the amount and polarity of voltages supplied to the piezoelectric actuators 112a, 112b vs the stiffness of the piezoelectric biasing elements 140a, 140b, as described above.

In the embodiment shown, the first piezoelectric actuator 112a is fixedly attached to the first spool 108a and the second piezoelectric actuator 112b is fixedly attached to the second spool 108b. However, it is not necessary for the first and second piezoelectric actuators 112a, 112b to be operatively connected to the respective first and second spools 108a, 108b by a direct or fixed connection. The phrase "operatively connected" also includes embodiments where the first and second piezoelectric actuators 112a, 112b are indirectly connected to the respective first and second spools 108a, 108b, for example by an intermediate member.

As discussed above, the servo valve 100 is controlled by supplying a voltage to the first and second piezoelectric actuators 112a, 112b causing a change in dimension thereof to translate the first and second spools 108a, 108b. The voltage can be supplied to each of the first and second piezoelectric actuators 112a, 112b independently to change the axial dimension of each piezoelectric actuator 112a, 112b by a suitable control system. This allows the first and second spools 108a, 108b to be independently translated. This can advantageously enable the fluid flow through the control ports 104a, 104b to be controlled individually to bring the overall response of the servo valve 100 closer to the ideal response line 20 shown in FIG. 3.

Accordingly, the embodiments of the present disclosure may provide a more accurate and adjustable servo valve 100, that can dispense with the need for a separate pilot stage and can provide more tolerance and correction for wear and spool translation inconsistencies during the operational lifetime of the servo valve.

Additionally, using two spools 108a, 108b instead of one spool as is known in the prior art, may advantageously reduce the number of high-tolerance lands per spool that are necessary, and simplifies and reduces the cost of manufacture and replacement thereof. It also reduces the weight of each spool 108a, 108b that may improve each spool's 108a, 108b response time and displacement sensitivity, which can result in more accurate and precise servo valve 100 operation.

It will be appreciated that the above embodiments are exemplary only and that modifications thereto may be made within the scope of the disclosure.

The invention claimed is:

1. A servo valve comprising:
a first spool extending along a first spool axis;
a second spool extending along a second spool axis;
a first piezoelectric actuator operatively connected to the first spool for translating the first spool in response to a voltage applied thereto; and
a second piezoelectric actuator operatively connected to the second spool for translating the second spool in response to a voltage applied thereto; wherein:
the first piezoelectric actuator is disposed against a first axial end of the first spool and a first biasing element is disposed against a second, opposing axial end of the first spool; and
the second piezoelectric actuator is disposed against a first axial end of the second spool, and a second biasing element is disposed against a second, opposing axial end of the second spool;
translation of the first and second spools compresses or expands the first and second biasing elements; and
the first and second biasing elements comprise piezoelectric discs, and compression or expansion of the first and second biasing elements creates a dimensional change in the piezoelectric discs that generates a voltage indicative of the amount of dimensional change.

2. The servo valve of claim 1, wherein the first and second spool axes are co-axial.

3. The servo valve of claim 1, wherein the first piezoelectric actuator extends along a first piezoelectric actuator axis co-axial with the first spool axis, and the second piezoelectric actuator extends along a second piezoelectric actuator axis co-axial with the second spool axis.

4. The servo valve of claim 1, wherein the first piezoelectric actuator is fixedly attached to the first spool and the second piezoelectric actuator is fixedly attached to the second spool.

5. The servo valve of claim 1, wherein the servo valve is configured such that each of the first and second piezoelectric actuators is independently controllable, such that the first and seconds spools are independently translatable.

6. The servo valve of claim 1, further comprising:
a servo valve housing including:
a first spool cavity defining a first inner cavity surface, wherein the first spool is disposed within the first spool cavity;
a second spool cavity defining a second inner cavity surface, wherein the second spool is disposed within the second spool cavity;
a first control port opening into the first cavity for fluid communication therewith; and
a second control port opening into the second cavity for fluid communication therewith.

7. The servo valve of claim 6, wherein:
the first spool comprises a first pair of lands separated by a first groove defining a first metering edge and an opposing second metering edge;
the second spool comprises a second pair of lands separated by a second groove defining a third metering edge and an opposing fourth metering edge;
the first pair of lands are in sliding contact with the first inner cavity surface, and translation of the first spool allows the first and second metering edges to open or close a respective gap (X1) between the first and second metering edges and the first inner cavity surface; and
the second pair of lands are in sliding contact with the second cavity inner surface, and translation of the second spool allows the third and fourth metering edges to open or close a respective gap (X2) between the third and fourth metering edges and the second inner cavity surface.

8. The servo valve of claim 7, further comprising:
a supply port upstream of the first and second spool cavities;
a first supply chamber opening into the first spool cavity;
a second supply chamber opening into the second spool cavity, wherein the first and second supply chambers are in fluid communication with the supply port and are configured to communicate fluid from the supply port to the first and second spool cavities, respectively;
a return port downstream of the first and second spool cavities;
a first return chamber opening into the first spool cavity; and
a second return chamber opening into the second spool cavity, wherein the first and second return chambers are in fluid communication with the return port and are configured to communicate fluid from the first and second spool cavities to the return port, respectively;

wherein:
translation of the first spool allows the first metering edge to open or restrict a first fluid flow path between the first supply chamber and the first control port, and allows the second metering edge to open or restrict a second fluid flow path between the first control port and the first return chamber; and translation of the second spool allows the third metering edge to open or restrict a third fluid flow path between the second supply chamber and the second control port, and allows the fourth metering edge to open or restrict a fourth fluid flow path between the second control port (104*b*) and the second return chamber.

9. An actuation system comprising:
the servo valve of claim 6; and
a hydraulic actuator in fluid communication with the first and second control ports, such that translation of the first and second spools controls movement of the hydraulic actuator.

10. A method of controlling the servo valve of claim 1, the method comprising:
supplying a voltage to the first and second piezoelectric actuators causing a change in dimension thereof to translate the first and second spools.

11. The method of claim 10, further comprising supplying voltage to each of the first and second piezoelectric actuators independently to change the axial dimension of each piezoelectric actuator independently.

\* \* \* \* \*